(12) United States Patent
Ito

(10) Patent No.: US 12,545,198 B2
(45) Date of Patent: Feb. 10, 2026

(54) POWER CONVERSION UNIT WITH STRUCTURE FOR HOLDING WIRE HARNESS

(71) Applicant: TOYOTA JIDOSHA KABUSHIKI KAISHA, Toyota (JP)

(72) Inventor: Sho Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 228 days.

(21) Appl. No.: 18/468,305

(22) Filed: Sep. 15, 2023

(65) Prior Publication Data

US 2024/0157892 A1 May 16, 2024

(30) Foreign Application Priority Data

Nov. 11, 2022 (JP) .................... 2022-181194

(51) Int. Cl.
*B60R 16/02* (2006.01)
*H02G 3/14* (2006.01)
*H02G 3/16* (2006.01)
*H05K 7/14* (2006.01)

(52) U.S. Cl.
CPC ..... *B60R 16/0215* (2013.01); *H05K 7/14322* (2022.08); *H02G 3/14* (2013.01); *H02G 3/16* (2013.01)

(58) Field of Classification Search
CPC ........ B60R 16/0215; H02G 3/16; H02G 3/14; H05K 7/14322
See application file for complete search history.

(56) References Cited

U.S. PATENT DOCUMENTS 8,058,553 B2 * 11/2011 Saito ..................... G06F 1/1616
361/679.26
2014/0227570 A1 8/2014 Hoshi et al.
2022/0007539 A1 1/2022 Horie

FOREIGN PATENT DOCUMENTS

| JP | 2011259605 A | * | 12/2011 |
|---|---|---|---|
| JP | 2012-237723 A | | 12/2012 |
| JP | 5370277 B2 | | 12/2013 |
| JP | 2014-036154 A | | 2/2014 |
| JP | 2015-203383 A | | 11/2015 |
| WO | 2020/174934 A1 | | 9/2020 |

\* cited by examiner

*Primary Examiner* — James Wu
(74) *Attorney, Agent, or Firm* — SoraIP, Inc.

(57) ABSTRACT

The power conversion unit of the vehicle includes a power converter, a wire harness electrically connected to the power converter, a housing that houses the power converter and the wire harness, and a lid that covers an opening of the housing. The housing has a rib that is a part of the side wall portion thereof and protrudes to the inside of the housing and extends toward the lid, and forms a recessed portion that opens toward the lid with a part of the side wall portion. The rib and the lid define a holding portion of the wire harness.

12 Claims, 2 Drawing Sheets

POWER CONVERSION UNIT WITH STRUCTURE FOR HOLDING WIRE HARNESS

CROSS-REFERENCE TO RELATED APPLICATION his application claims priority to Japanese Patent Application No. 2022-181194 filed on Nov. 11, 2022, incorporated herein by reference in its entirety.

BACKGROUND

1. Technical Field

The technique disclosed in the present specification relates to power conversion units for, for example, vehicles.

2. Description of Related Art

For example, in power conversion units for vehicles such as battery electric vehicles, an inverter, a converter, etc. are housed in a housing. Wires for electrical connection of a power converter and transfer of control signals between the inside and outside of the housing are housed as a wire harness in the housing.

A power conversion unit having no specific component for housing such a wire harness and a configuration for housing the wire harness that can save space have been disclosed (Japanese Unexamined Patent Application Publication No. 2011-259605 (JP 2011-259605 A)). This configuration for housing the wire harness uses clearance between the inner surface of a wall portion of a housing and the outer peripheral surface of a frame housed in the housing in order to house an inverter in the housing. The width of a narrowest part of this clearance is set to a value smaller than the outside diameter of the wire harness. The wire harness is thus held in the clearance.

SUMMARY

In this configuration for housing the wire harness, however, the wire harness is held in the clearance between the housing and the frame. Therefore, the wire harness may come out of the clearance due to vibration of the vehicle etc., and it may not be possible to reliably hold and house the wire harness.

The present specification provides a technique of reliably holding a wire harness without adding any specific component in order to hold and house the wire harness in a power conversion unit.

The technique disclosed in the present specification is embodied in a power conversion unit for a vehicle. The power conversion unit includes: a power converter; a wire harness electrically connected to the power converter; a housing that houses the power converter and the wire harness; and a lid that covers an opening of the housing. The housing includes a rib, the rib being part of a side wall portion of the housing, and protruding toward inside of the housing and extending toward the lid. The rib provides a recessed portion between the lid and the part of the side wall portion, the recessed portion being open toward the lid. The rib and the lid define a holding portion that holds the wire harness.

According to the power conversion unit disclosed in the present specification, the wire harness is held and housed by the lid and the rib that is part of the side wall portion of the housing. It is therefore possible to avoid the use of a specific component for holding and housing the wire harness. Moreover, since the lid and the rib that is part of the side wall portion of the housing define the holding portion that holds the wire harness, the wire harness is reliably held in the holding portion and does not come out of the holding portion. Accordingly, it is possible to avoid the wire harness interfering with other components in the housing and to avoid the wire harness being damaged due to interference.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A power conversion unit for a vehicle disclosed in this specification includes a power converter, a wire harness electrically connected to the power converter, a housing that houses the power converter and the wire harness, and a lid that covers an opening of the housing. The housing has a rib that is a part of a side wall portion of the housing and protrudes to the inside of the housing and extends toward the lid. The rib forms a recessed portion that directs and opens the lid between the rib and a portion of the side wall portion. The rib and the lid may define a holding portion of the wire harness.

According to this power conversion unit, the wire harness can be defined by the side wall portion of the housing and the lid. Therefore, the degree of freedom in design of the portion for accommodating and holding the wire harness is high, and the positional relationship between the power converter and the wire harness can be optimized to contribute to space saving.

In the power conversion unit disclosed in the present specification, the rib may have a seat surface that abuts on an outer peripheral surface of an outer peripheral surface of the wire harness on an opposite side of the lid. The seat surface abuts against the outer peripheral surface of the wire harness. Thus, the wire harness can be stably held.

In any of the power conversion units disclosed herein, the holding portion may hold the wire harness near an edge of the opening of the housing. A wire harness is held near the edge of the opening of the housing. As a result, the space on the opening side and the space on the outer peripheral side of the housing can be effectively utilized, and the wire harness can be easily attached.

In any of the power conversion units disclosed herein, the holding portion may hold the wire harness in a position that is the same as or higher than a height position at which the wire harness is electrically connected to the power converter. In this way, the wire harness can be connected to the power converter accommodated in the opening side of the housing with a short wire harness connection distance and without a large difference in height. Accordingly, a power conversion unit that is more excellent in space saving is provided.

Any of the power conversion units disclosed herein includes a cut portion on an outer peripheral side of the housing for inserting and engaging a catching member for moving the power conversion unit. The rib has a seat surface that abuts on an outer peripheral surface of the outer peripheral surface of the wire harness on the opposite side of the lid. At least a part of the side wall portion constituting the seat surface in the rib may define a cutout portion. In this way, the wire harness can be efficiently accommodated and held. At the same time, the assembling and removing operations of the power conversion unit and the like can be facilitated.

Figure 1:
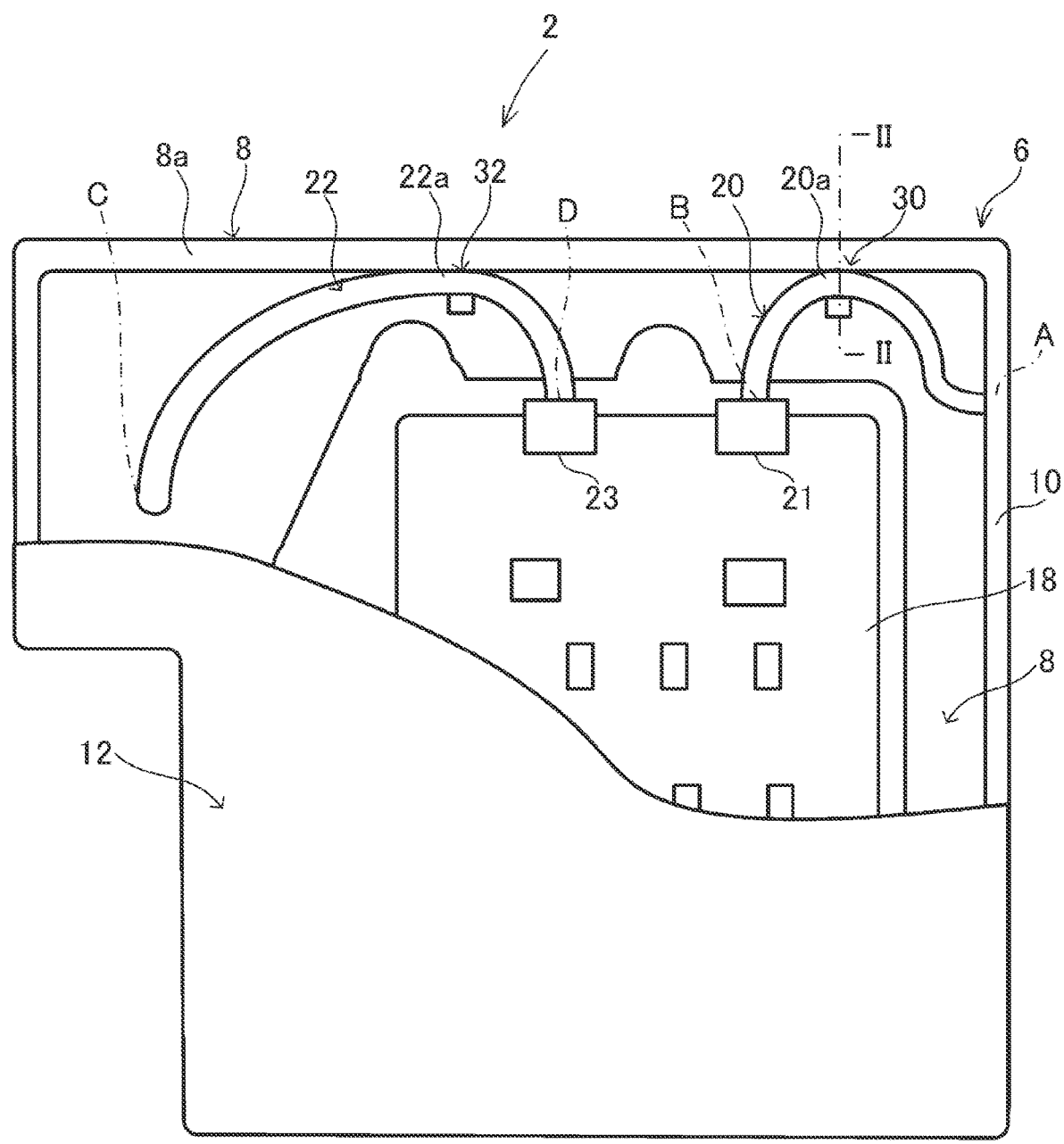
FIG. 1 is a plan view of a power conversion unit disclosed herein with a lid partially broken away.
Figure 2:
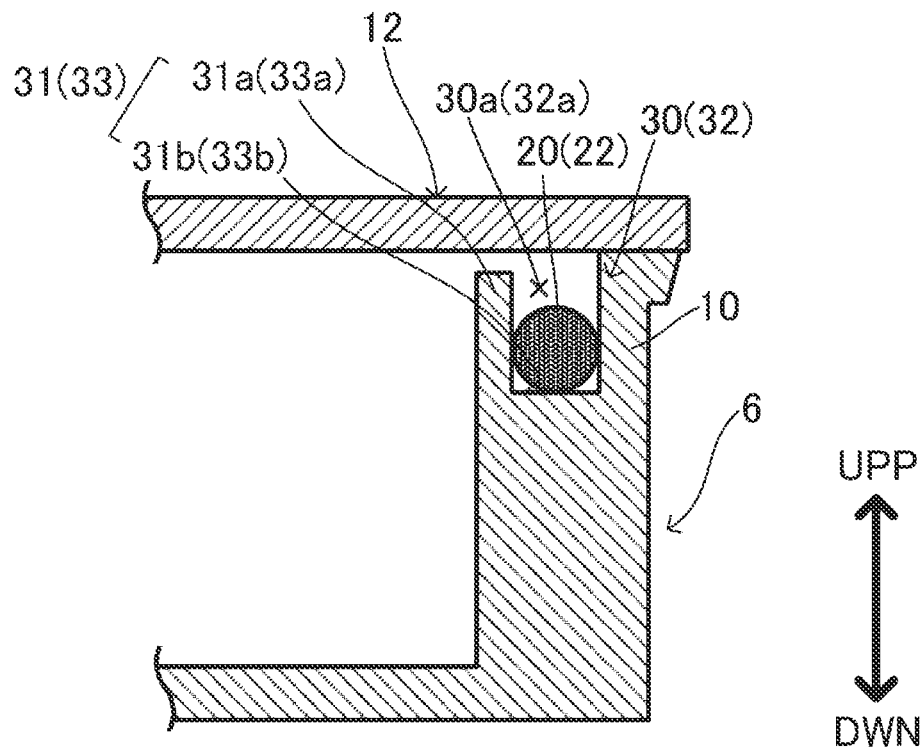
FIG. 2 is a cross-sectional view taken along II-II line in FIG. 1.

Hereinafter, a voltage conversion unit of a vehicle disclosed in the present specification will be described with reference to the drawings as appropriate. FIG. 1 is a diagram illustrating an example of a power converter and a power conversion unit that houses a wire harness. FIG. 2 is a diagram illustrating a structure of a holding portion of a wire harness in the power conversion unit illustrated in FIG. 1.

The power conversion unit (hereinafter, simply referred to as a unit) houses a control circuit board and the like in addition to a power converter such as an inverter, for example. The power conversion unit may also be part of an electric drive module that integrates a motor, an inverter, and a transaxle. Examples of the vehicle include a vehicle that drives an axle using a motor. Examples include battery electric vehicle (BEV), hybrid electric vehicle (HEV), plug-in hybrid electric vehicle (PHEV), fuel cell electric vehicle (FCEV).

In the following description, the vehicle upper part and the vehicle lower part may be simply referred to as "upper part" and "lower part", respectively. In addition, in the drawings, the vehicle upper side is indicated by UPP, and the vehicle lower side is indicated by DWN.

The unit 2 shown in FIG. 1 is a power conversion unit as part of an electric drive module for a HEV. The unit 2 is integrated with a motor (not shown) and a transformer skeleton, and includes an inverter (not shown), a control circuit board 18 of the inverter, and wire harnesses 20 and 22 in an accommodation space defined by the housing 6 and the lid 12.

The housing 6 has a substantially rectangular opening 8. The housing 6 is formed as a box having a predetermined height. The housing 6 is usually formed by aluminum die casting or the like. The housing 6 includes a side wall portion 10 defining a substantially rectangular opening 8 and forming an outer periphery. The lid 12 is a flat plate that covers the opening 8 of the housing 6. The lid 12 is made of, for example, metal. The lid 12 is fixed to the housing 6 by a bolt or the like.

The housing 6 houses the inverter and the control circuit board 18 in order from the bottom. The control circuit board 18 is disposed slightly below the edge 8a of the opening 8 of the housing 6.

Wire harnesses 20 and 22 are accommodated in the housing 6. The wire harness 20 is responsible for signaling the control circuit board 18 of the inverter to and from the motor-generator electronic control unit (MG-ECU) and electrified vehicle ECU (EV-ECU), the auxiliary battery, and the like. The wire harness 22 is responsible for transmitting the resolver signal from MG-ECU and the signal from the thermal sensor.

The wire harnesses 20 and 22 are electrically connected to the control circuit board 18 via the connectors 21 and 23, respectively. Each of the wire harnesses 20 and 22 is electrically connected to an external MG-ECU or the like of the housing 6 via an external connector (not shown).

The wire harnesses 20 and 22 are accommodated in the housing 6 at substantially the same height position as the control circuit board 18 or at a position higher than the control circuit board 18. The wire harness 20 connects a predetermined portion A of the side wall portion 10 to a predetermined portion B including the connector 21 of the control circuit board 18. Therefore, the wire harness 20 is accommodated with the curved most bent portion 20a abutted along the side wall portion 10. In addition, the wire harness 22 connects from a predetermined portion C inside the housing 6 to a predetermined portion D including the connector 21 of the control circuit board 18. The wire harness 22 is accommodated with the curved most bent portion 22a abutted along the side wall portion 10.

In FIG. 2, the wire harness 22 is represented by a cross section of the wire harness 20. As shown in FIG. 2, the holding portions 30 and 32 holding the wire harnesses 20 and 22 are formed inside the side wall portion 10 by the ribs 31 and 33 formed by a part of the side wall portion 10 and the lid 12. The ribs 31 and 33 have a vertical wall portion 31a, 33a in which a part of the side wall portion 10 extends toward a lid 12. Further, the ribs 31 and 33 protrude from the side wall portion 10 to the inside of the housing 6 by a predetermined amount, and have a seat surface 31b, 33b that abuts on an outer peripheral surface (an outer peripheral surface opposite to the lid 12) below the wire harnesses 20 and 22. The ribs 31, 33, together with the inner surface of the base of the side wall portion 10 from which they extend, open generally towards the lid 12. The ribs 31 and 33 form a recessed portion 30a, 32a capable of holding part of the predetermined wire harnesses 20 and 22 along the side wall portion 10.

The height of the ribs 31 and 33 (the vertical wall portion 31a, 33a) is not particularly limited. However, the height of the ribs 31 and 33 is formed to be equal to or higher than the diameter of the wire harnesses 20 and 22, respectively. Further, the upper ends of the ribs 31 and 33 are close to the inner surface of the lid 12. Preferably, these upper ends extend to a height such that they do not abut the lid 12 but only allow a gap that is sufficiently smaller than the diameter of the wire harnesses 20, 22.

In addition, the length of the ribs 31 and 33 along the side wall portion 10 is formed to a length sufficient to securely fix the curved wire harnesses 20 and 22. The width of each of the ribs 31 and 33 in the seat surface 31b, 33b (the length along the direction from the side wall portion 10 toward the inside of the housing 6) substantially corresponds to the diameter of each of the wire harnesses 20 and 22. The width is not particularly limited. However, the wire harnesses 20 and 22 are formed so as to be fixed by pushing the wire harnesses toward the seat surface 31b, 33b from above the recessed portions 30a, 32a.

The ribs 31 and 33 and the lid 12 disposed above them define a space for holding the wire harnesses 20 and 22 of the holding portions 30 and 32. In other words, the wire harnesses 20 and 22 are held by the vertical wall portion 31a, 33a, the seat surface 31b, 33b, the side wall portion 10, and the lid 12.

Next, the operation and the like of holding and accommodating the wire harnesses 20 and 22 in the unit 2 will be described. The wire harnesses 20 and 22 are held by the holding portions 30 and 32, and the holding portions 30 and 32 have an accommodation space defined by the ribs 31 and 33 and the lid 12 which are formed by a part of the housing 6. The wire harnesses 20, 22 are held in a receiving space defined by the side wall portion 10 and the lid 12. Therefore, it is possible to reliably avoid the wire harnesses 20 and 22 from protruding from the holding portions 30 and 32 to the outside due to vibration such as during traveling of the vehicle. Accordingly, the intended holding and accommodation structure of the wire harnesses 20 and 22 is maintained, and interference with other components can be avoided, and damage to the wire harnesses 20 and 22 can be avoided. In addition, the holding portions 30 and 32 capable of securely holding the wire harnesses 20 and 22 can be provided while avoiding separately preparing unique component elements.

Further, since the holding portions 30 and 32 are constituted by the side wall portion 10 and the lid 12 of the housing 6, the wire harnesses 20 and 22 can be held in contact with the inner surface of the side wall portion 10 and directly under the lid 12. As a result, the space above and on the outer peripheral side of the element such as the control circuit board 18 in the housing 6 can be effectively utilized. Accordingly, a space for holding and accommodating the wire harnesses 20 and 22 can be saved. In particular, since the wire harnesses 20 and 22 can be held in the vicinity of the edge 8a of the opening 8 of the housing 6, the housing 6 can be made compact.

Furthermore, the side wall portion 10 and the lid 12 of the housing 6 constitute the holding portions 30 and 32, and the use of unique parts is avoided. Therefore, it is possible to increase the degree of freedom of the wiring pattern for the wire harnesses 20 and 22. In particular, the wire harnesses 20 and 22 can be easily wired on the outer periphery and above the control circuit board 18 of the housing 6. Therefore, it is possible to adopt the most appropriate wiring pattern for the control circuit board 18, for example, a wiring pattern in consideration of the suppression of the vibratory noise during the traveling of the vehicle and the ease of assembling the wire harnesses 20 and 22.

In addition, the holding portions 30 and 32 form a recessed portion 30a, 32a that opens toward the lid 12. Therefore, the wire harnesses 20 and 22 can be easily assembled by fitting the wire harnesses 20 and 22 from above the opening.

Figure 3:
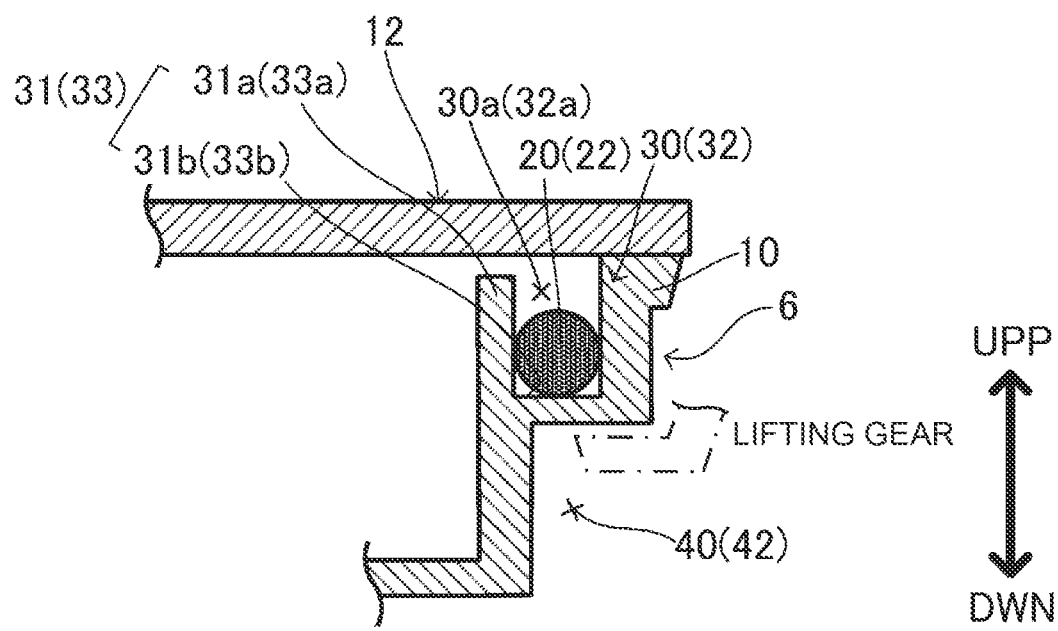
FIG. 3 is a diagram illustrating another embodiment of a holding portion of wire harness.

In the embodiment described above, the side wall portions 10 constituting the seat surface 31b, 33b of the ribs 31 and 33 of the holding portions 30 and 32 have a thickness that reaches the seat surface 31b, 33b. However, the thickness of the side wall portion 10 is not limited thereto. For example, as shown in FIG. 3, the wall thickness of at least a part of the lower side wall portion 10 constituting the seat surface 31b, 33b may be reduced to form the cut portions 40 and 42. By providing the cut portions 40 and 42, the material and the like of the housing 6 can be reduced. Further, in the manufacturing process of the vehicle and the maintenance work of the vehicle in the portion, it is possible to easily lift and lift the unit 2 to attach and detach the unit 2. This is because the catching member used for such an operation can be inserted into and engaged with the cut portions 40 and 42.

Although the specific examples disclosed by the present disclosure have been described in detail above, these are merely examples and do not limit the scope of claims. The techniques described in the claims include various modifications and alterations of the specific examples illustrated above. The technical elements described in this specification or in the drawings may be used alone or in various combinations, and are not limited to the combinations described in the claims at the time of filing. The technology illustrated in the present specification or the drawings can achieve a plurality of objects at the same time, and has technical usefulness in achieving one of the objects.

What is claimed is:

1. A power conversion unit for a vehicle, the power conversion unit comprising:
    a power converter;
    a control circuit board for the power converter;
    a wire harness electrically connected to the control circuit board via a connector;
    a housing that houses the power converter, the control circuit board, and the wire harness, the housing including a first side wall portion and a second side wall portion intersecting the first side wall portion; and
    a lid that is fixed to the housing to cover an opening of the housing,
    wherein the housing includes a rib, the rib being part of the second side wall portion of the housing, and protruding toward inside of the housing and extending toward the lid, the rib providing a recessed portion between the lid and the part of the second side wall portion, and the recessed portion being open toward the lid,
    wherein the rib and the lid define a holding portion that holds the wire harness,
    wherein the wire harness is fixed to the first side wall portion and extends to the connector in a curved manner such that a maximally bent part of the wire harness abuts the second side wall portion, and
    wherein the holding portion holds the maximally bent part of the wire harness.

2. The power conversion unit according to claim 1, wherein the rib includes a seat surface that contacts part of an outer peripheral surface of the wire harness, the part of the outer peripheral surface being located on an opposite side of the wire harness from the lid.

3. The power conversion unit according to claim 2, wherein the holding portion holds the wire harness near an edge of the opening of the housing.

4. The power conversion unit according to claim 3, wherein the holding portion holds the wire harness either at a same position as a height position at which the wire harness is electrically connected to the control circuit board or at a position higher than the height position.

5. The power conversion unit according to claim 4,
    wherein the housing includes a cut portion provided at the second side wall portion of the housing, and
    wherein the second side wall portion of the housing has a thickness that is thinner at a part below the seat surface of the rib than at a part including the seat surface.

6. The power conversion unit according to claim 2, wherein the holding portion holds the wire harness such that a distance from the outer peripheral surface of the wire harness to a surface of the lid fixed to the housing is smaller than a diameter of the wire harness, the surface of the lid facing the wire harness.

7. The power conversion unit according to claim 2,
    wherein the rib includes an inner wall and an outer wall that together with the seat surface define the recessed portion, the inner wall being located on an inner side of the housing with respect to the outer wall,
    wherein the outer wall includes a free end that contacts the lid in a case where the lid is fixed to the second side wall portion, and
    wherein the inner wall includes a free end that does not contact the lid in a case where the lid is fixed to the second side wall portion.

8. The power conversion unit according to claim 7, wherein the inner wall has a length from the seat surface to the free end of the inner wall that is shorter than a length of the outer wall from the seat surface to the free end of the outer wall.

9. The power conversion unit according to claim 2,
   wherein the rib includes an inner wall and an outer wall that together with the seat surface define the recessed portion, the inner wall being located on an inner side of the housing with respect to the outer wall,
   wherein the inner wall has a first inner wall end connected to the seat surface and a second inner wall end that is a free end and that faces the lid fixed to the housing,
   wherein the outer wall has a first outer wall end connected to the seat surface and a second outer wall end that is a free end and that faces the lid fixed to the housing, and
   wherein the inner wall has a length from the first inner wall end to the second inner wall end that is shorter than a length of the outer wall from the first outer wall end to the second outer wall end.

10. The power conversion unit according to claim 1, wherein the rib includes a seat surface that contacts an outer peripheral surface of the wire harness and that faces a surface of the lid fixed to the housing.

11. The power conversion unit according to claim 10, wherein the rib has a width in a direction from the second side wall portion toward an inner side of the housing, the width having a dimension that allows the wire harness to be pushed into the recessed portion and fixed to the rib.

12. The power conversion unit according to claim 1, wherein the lid is a flat plate and is fixed to the first side wall portion and the second side wall portion of the housing.

\* \* \* \* \*